(No Model.)

W. G. RICHARDS.
CALIPERS FOR MEASURING.

No. 328,861. Patented Oct. 20, 1885.

Witnesses
William L. Slade
Walter L. Brown

Inventor.
William G. Richards

N. PETERS, Photo-Lithographer, Washington, D. C.

UNITED STATES PATENT OFFICE.

WILLIAM G. RICHARDS, OF PROVIDENCE, RHODE ISLAND.

CALIPERS FOR MEASURING.

SPECIFICATION forming part of Letters Patent No. 328,861, dated October 20, 1885.

Application filed January 13, 1885. Serial No. 152,721. (No model.)

*To all whom it may concern:*

Be it known that I, WILLIAM G. RICHARDS, a citizen of the United States, residing at Providence, in the county of Providence and State of Rhode Island, have invented new and useful Calipers, and that according to my knowledge and belief the same has not been in public use or on sale in the United States for more than two years prior to this application.

My invention relates to improvements in calipers composed of two limbs, adjustable at the base; and the object of my improvement is to provide a secondary sensitive adjustment in addition to a quick primary adjustment at the base. I attain this object by the mechanism illustrated in the accompanying drawings, in which—

Figure 1:
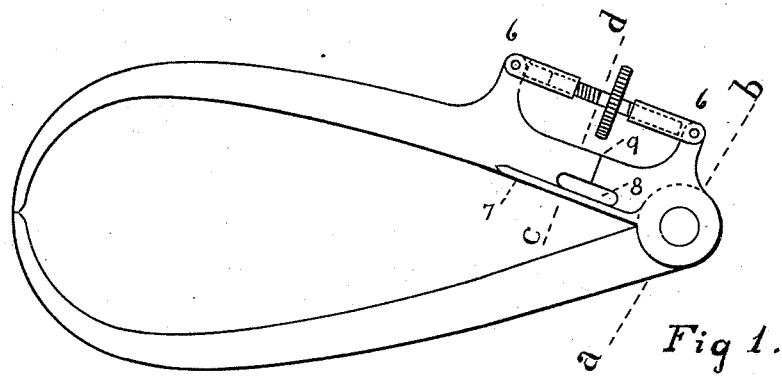
Figure 2:
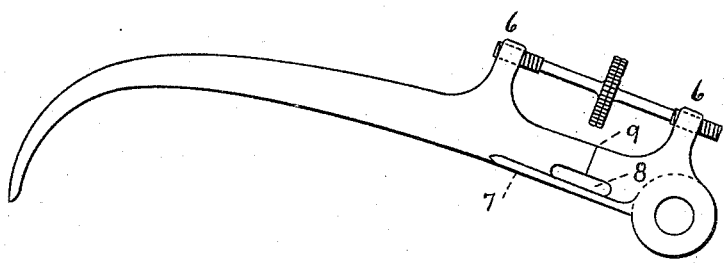
Figure 5:
Figure 4:
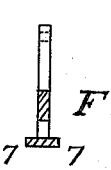

Figure 1 is a view of the instrument complete; Fig. 2, another form of screw for adjusting; Fig. 4, a section on line $a\,b$; Fig. 5, a section on line $c\,d$.

Similar numbers refer to similar parts throughout the several views.

Fig. 1 represents calipers composed of two limbs with joint at base, one limb of which in part of its length is composed of two chords. The inside chord is made in the form of a spring and the outside chord in the form of a screw, and connected by projecting arms, as shown in Fig. 1, or as in Fig. 2. The screw has a thread of a given pitch at the end nearest the base of instrument, a thread of less pitch on opposite end, and works in threaded bearings 6 6. As it is rotated its bearings are moved from or toward each other a distance equal to the difference in pitch of thread multiplied by the number of revolutions made by the screw. This action is multiplied at point of limb. This provides a sensitive secondary adjustment in addition to the primary adjustment at the base. At the point where the limb is reduced to form one of the chords ribs 7 7 are added to give sufficient rigidity to the limb in directions not controlled by the opposite chord. At 9 two points project, which, when in contact, form a stop, which prevents the inner chord being broken by contraction of the outer chord. The action of the screw forming the outer chord places the inner chord under tension as soon as it is forced away from this stop. Consequently there is no lost motion in the bearings of the screw. If the arrangement shown in Fig. 2 is used, the bearings 6 6 are thrown out of line when expanded, and the body of the screw must take the form of an arc.

Calipers composed of two limbs and having a secondary adjustment are not new; but

What I claim as new, and desire to secure by Letters Patent, is—

1. Calipers one limb of which in part of its length is composed of two chords, and so constructed that one chord can be extended or contracted, thereby deflecting the portion of limb beyond the chords, as and for the purposes set forth.

2. Calipers composed of two limbs, one of which has two projecting arms with a connection between, which forms one of the two chords, said chord being adjustable as to length, and the limb being reduced between the arms where it forms the opposite chord, as and for the purposes set forth.

3. In calipers composed of two limbs, the ribs 7 7, projecting from the body of one limb at right angles to the arms which connect the chords, in combination with the projecting arms and the opposite adjustable chord.

4. In calipers composed of two limbs, a differential screw forming one of the two chords which compose the base of one limb having a thread of a given pitch at one end, a thread of greater or less pitch at opposite end, and working in threaded bearings attached to the arms, said arms connecting the ends of the chords, as and for the purposes set forth.

5. In calipers composed of two pivoted limbs, the swinging threaded bearings 6 6, in combination with a differential adjusting-screw, a limb having ribs 7 7, the projecting arms, and reduced between said arms where it forms one of the two chords which compose the base of limb, so as to spring enough to permit the opposite chord to be extended or contracted.

WILLIAM G. RICHARDS.

Witnesses:
WM. L. SLADE,
WALTER L. BROWN.